United States Patent [19]

George et al.

[11] Patent Number: 5,240,760
[45] Date of Patent: Aug. 31, 1993

[54] POLYSILOXANE TREATED ROOFING GRANULES

[75] Inventors: Billy L. George; Stefan A. Babirad, both of Hudson, Wis.; Margaret M. Nauman, Hastings, Minn.

[73] Assignee: Minnesota Mining and Manufacturing Company, St. Paul, Minn.

[21] Appl. No.: 832,836

[22] Filed: Feb. 7, 1992

[51] Int. Cl.$^5$ .............................................. B32B 5/16
[52] U.S. Cl. ..................................... 428/145; 428/291; 428/405; 428/489
[58] Field of Search ............... 428/405, 145, 141, 291, 428/489, 407, 402, 404, 336; 427/186; 106/499, 281.1

[56] References Cited

U.S. PATENT DOCUMENTS

| | | | |
|---|---|---|---|
| 2,118,898 | 5/1938 | Price | 428/145 |
| 2,595,465 | 5/1952 | Keene et al. | 428/404 |
| 2,927,045 | 3/1960 | Lodge et al. | 428/405 |
| 3,397,073 | 8/1968 | Fehner | 428/405 |
| 3,752,696 | 8/1973 | Beyard et al. | 428/407 |
| 4,895,754 | 1/1990 | Graham et al. | 428/289 |
| 5,035,748 | 7/1991 | Burow et al. | 106/499 |

OTHER PUBLICATIONS

U.S. patent application Ser. No. 07/574,264.

Primary Examiner—Thomas J. Herbert, Jr.
Attorney, Agent, or Firm—Gary L. Griswold; Walter N. Kirn; Karl G. Hanson

[57] ABSTRACT

Roofing granules having surfaces treated with a polysiloxane that has a long-chain hydrocarbon group bonded to a silicon atom on the polysiloxane backbone wherein the long-chain hydrocarbon group preferably is a straight or branched aliphatic group having 5 to 30 carbon atoms and the roofing granules treated with such polysiloxanes demonstrate good dust control and water repellency, and also resist staining from oils in asphalt-based substrates.

27 Claims, No Drawings

POLYSILOXANE TREATED ROOFING GRANULES

TECHNICAL FIELD

This invention pertains to polysiloxane treated roofing granules, and more particularly to roofing granules that are treated with a polysiloxane that has a long-chain hydrocarbon group.

BACKGROUND OF THE INVENTION

In North America, asphalt-based roofing materials are a popular medium for covering roofs on homes and other structures. Asphalt-based roofing materials come in shingle or roll form, the shingle being the more widely used material. A typical asphalt shingle or roll has an asphalt substrate and a multitude of roofing granules placed thereon. The roofing granules serve two purposes: (1) to protect the asphalt from exposure to ultraviolet rays; and (2) to provide color to the roofing material and ultimately to a roof.

Roofing granules come in a variety of colors ranging from white to black. Color has been provided to non-colored (raw) roofing granules in the following manner. First, raw granules of about 420-1680 micrometers (40 to 12 US mesh) are preheated to approximately 100°-300° F. (38°-150° C.). A paint slurry containing a pigment is then applied to the heated granules in a mixer. The color coated granules are then further heated in a kiln to about 350° to 1200° F. (175°-650° C.). This temperature may vary depending on the composition of the paint slurry. The granules are then cooled to approximately 210°-240° F. (100°-115° C.).

After being colored, the granules are passed to a post-treatment stage where the granules are treated with a solution of silicone and oil. The silicone/oil solution typically contains a petroleum oil and a mixture of various silicones. Typically, the silicones are derivatives of polydimethylsiloxane. The silicone/oil solution is applied to the colored roofing granules to reduce dust formation, to provide water repellency, and to promote adhesion of the granules to the asphalt-based substrate. After the silicone/oil treatment, the roofing granules are removed from the post-treatment stage, transported, and subsequently applied to an asphalt substrate.

When the roofing granules are secured to an asphalt-based substrate, there is a tendency for oils in the asphalt substrate to creep onto or be adsorbed on the granules' surfaces. This creeping or adsorption of the asphaltic oils on the roofing granules' surfaces causes a discoloration or staining of the roofing granules and hence the shingles. Although the discoloration is normally removed by weathering after the shingles are placed on a roof, there is nonetheless a disparity in color between what the consumer sees at the time of purchase and what the ultimate color of roof becomes after weathering. This color disparity is especially emphasized when the shingles have a lighter color, particularly white.

U.S. Pat. No. 2,927,045 discloses colored roofing granules that resist discoloration from oil. Raw granules are treated with a small amount of silicone during the colorization stage. The silicone is dispersed in a pigment composition, and the resulting composition is applied to the raw granules in a mixer. The coated granules are then transferred to a kiln where the granules are heated. Silicone compounds that contain long-chain alkyl or aryl groups are disclosed as being less desirable silicone additives. The long-chain organosilicones are less desirable because they tend to char when heated to elevated temperatures (column 3, lines 12—12).

SUMMARY OF THE INVENTION

This invention provides a roofing granule composition that comprises a plurality of colored roofing granules and a polysiloxane. The polysiloxane has at least one long-chain hydrocarbon group bonded to a silicon atom on the polysiloxane backbone. An effective amount of the polysiloxane is applied to the roofing granules' surfaces in a post-treatment stage.

It has been discovered that when roofing granules' surfaces are treated with a polysiloxane having a long-chain hydrocarbon group, there is a significant reduction in adsorption of asphaltic oils on the granules' surfaces. In addition, it has also been discovered that the roofing granules are not as susceptible to creating dust. A reduction in dust creation is desirable because it improves the working environment around where roofing granules are handled in bulk quantities.

This invention also provides a new method of making a roofing granule composition. The method comprises applying an effective amount of a polysiloxane to surfaces of roofing granules. The polysiloxane used in this method has at least one long-chain hydrocarbon group bonded to a silicon atom on the backbone of the polysiloxane. The polysiloxane is applied to the roofing granules in a post-treatment stage. In a preferred embodiment, an adhesion agent is applied to the roofing granules' surfaces in conjunction with the polysiloxane of this invention. The adhesion agent assists in adhering the roofing granules to an asphalt-based substrate.

As the terms are used herein:

"Long-chain" means a group that contains at least five carbon atoms.

"Hydrocarbon" means a group that contains hydrogen atoms bonded to carbon atoms. This includes groups that contain atoms other than C-H atoms, for example, oxygen, nitrogen, sulfur, and halogens.

"Post-treatment stage" means a stage in roofing granule processing which occurs after a color has been fixed to the roofing granules' surfaces.

"Short-chain" means a group that contains less than five carbon atoms.

DETAILED DESCRIPTION OF PREFERRED EMBODIMENTS OF THE INVENTION

In the practice of the present invention, asphalt oil creep and dust creation are significantly reduced by providing roofing granules that have surfaces treated with a polysiloxane, where the polysiloxane has a long-chain hydrocarbon group bonded to a silicon atom on the polysiloxane's backbone. Preferably, this polysiloxane is applied to the roofing granules with an adhesion agent in an oil solution.

Roofing granules employed in the present invention can be the presently known (or later-developed) roofing granules. The roofing granules can be, for example, of a weather-resistant mineral rock such as greenstone, nephelene syenite, common gravel, slate, gannister, quartz, quartzite, greystone, argillite, coal slag, copper slag, nickel slag, etc. Roofing granules are disclosed in U.S. Pat. No. 5,009,511, which are made from recycled materials. Typical roofing granules have sizes ranging from about 420-1680 micrometers (40 to 12 mesh US). The use of somewhat larger or smaller granules is within the scope of this invention, provided the granules have a size that permits to function as roofing granules.

Preferred polysiloxanes having long-chain hydrocarbon group(s) can be represented by units of the formula I in the polysiloxane backbone:

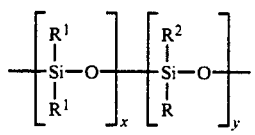

where R represents a long-chain hydrocarbon group, each $R^1$ independently represents hydrogen or a short-chain hydrocarbon group, $R^2$ represents R or $R^1$ (preferably $R^1$), x is an integer of zero to 300, and y is an integer of one to 300. It is to be understood that formula I implies no particular geometry between unit $[-(R^1)_2SiO-]$ and unit $[-RR^2SiO-]$. These units may be located randomly throughout the polysiloxane backbone. It is to be further understood that each R, $R^1$, and $R^2$ group may be the same or different from other R, $R^1$, and $R^2$ groups, respectively.

The long-chain hydrocarbon group may contain less than about 40 carbon atoms. The long-chain hydrocarbon group may be, for example, a straight chain or branched aliphatic group (e.g., alkyl, alkenyl, or alkynyl), preferably an alkyl or alkenyl such as hexyl, octyl, decyl, dodecyl, pentadecyl, octadecyl, triacontyl, octylenyl, pentadeylenyl, and nonacosylenyl; a polyoxyalkylenyl containing about 6 to 20 carbon atoms such as polyoxyhexylenyl, polyoxydecylenyl, polyoxyhexadecylenyl, and polyoxyicosylenyl; a substituted or unsubstituted aryl group having 6 to 14 ring atoms such as phenyl, benzyl, naphthyl, anthracenyl, phenanthrenyl, cumenyl, or mesityleny; an aralkyl having 6 to 14 ring atoms such as 2-phenylpropyl, β-phenylethyl, and 2 or 3-naphthylpropyl; or carboxyl or ester group having 5 to about 20 carbon atoms and derived from molecules such as lauric acid, mystyric acid, stearic acid, methylhexanoate, methyloctanoate, and methyloctadecanoate; a carbo- or heterocyclic group having 5 to 10 ring atoms such as cyclopentyl, cyclohexyl, pyranyl, pyridyl and morpholinyl.

Preferred long-chain hydrocarbon groups do not contain atoms other than C-H atoms, and are straight chain or branched aliphatic groups having 10 to 30 carbon atoms (more preferably 16 to 20 carbon atoms). More preferred long-chain hydrocarbon groups are straight chain or branched alkyl or alkenyl radicals, preferably alkyl radicals or are aralkyl radicals having 6 to 14 ring atoms. Polysiloxanes having long-chain aliphatic groups are described in U.S. Pat. No. 5,035,748, the disclosure of which is incorporated here by reference.

The short chain hydrocarbon groups may be an alkyl or vinyl radical. The alkyl group may be, for example, methyl, ethyl, propyl, isopropyl, butyl, and sec-butyl. The short-chain hydrocarbon group may be an alkyl group having less than 3 carbon atoms, preferably having 2 or less carbon atoms. $R^1$ preferably represents a methyl group. In the polysiloxane having units of the formula I, the $R^1$ groups need not be the same. For example, the polysiloxane may contain methyl, ethyl, or vinyl radicals as short-chain hydrocarbon groups. In a preferred polysiloxane at least 80 molar percent of the $R^1$ and $R^2$ groups are methyl, more preferably 90 molar percent, and more preferably all are methyl. The polysiloxanes may have terminal groups of the formula $-Si(R^2)_3$, or $-Si(R^1)_3$, preferably $-Si(CH_3)_3$. The terminal groups may be the same or different.

The polysiloxanes having a long-chain hydrocarbon group generally have average molecular weights of about 1000 to 50,000, more typically about 1,800 to about 20,000. There is generally up to about 300 silicon atoms in the polysiloxane having a long-chain hydrocarbon group. Typically, there are about 15 to 150 silicon atoms in the polysiloxane. The polysiloxanes generally will have up to about 50 long-chain hydrocarbon groups; y therefore usually ranges from about 1 to about 50. In a preferred embodiment, y is less than 30, more preferably less than 10, and even more preferably 2 to 3. The value of x generally is about 3 to 250, and preferably less than about 90.

Examples of preferred polysiloxanes that fall within formula I include: polymethylhexylsiloxane, polymethyloctylsiloxane, (35-40%)-methyloctyl-(3-4%) vinylmethyl-(56-64%) dimethylsiloxane terpolymer, polymethyloctadecylsiloxane, polymethyltetradecylsiloxane, polymethylhexadecylsiloxane, polymethylcyclohexylsiloxane oligomer, and polymethyl-α-methylstyrenesiloxane. The polysiloxanes can be used individually or as mixtures or combinations thereof.

Polysiloxanes having long-chain hydrocarbon groups are commercially available from Petrarch Systems, Bristol, Pa., and are also available from Shin Etsu Silicones, Tokyo, Japan, under the trademarks KF351, KF410, KF412, KF413, KF414, X-22-980, and X-22-3701E. Preferred polysiloxanes are available from Goldschmidt Chemical Corporation, Hopewell, Va., and are marketed under the trademark TEGOPREN. TEGOPREN 6800, 6801, and 6814 are the more preferred polysiloxanes available from Goldschmidt Chemical Corporation.

Polysiloxanes having a long-chain hydrocarbon group can be prepared by known methods such as those described in W. Knoll, *Chemistry & Technology of Silicones*, Academic Press (1968); and E. Warrick et al. *Developments in Silicon Elastomer Chemistry*, v. 52, ACS Rubber Div., Washington, D.C. (1979).

Preferably, a polysiloxane having a long-chain hydrocarbon group is applied to the roofing granules' surfaces in an amount sufficient to hinder adsorption of asphaltic oils on the roofing granules' surfaces. Generally, the polysiloxane can be applied at about 0.01 to 1 pounds per ton of roofing granules (0.005 to 0.05 weight percent). More preferably, the polysiloxane is applied at 0.05 to 0.5 pound per ton of roofing granules ($2.5 \times 10^{-3}$ to 0.025 weight percent), and even more preferably at 0.1 to 0.3 pound per ton of roofing granules (0.005 to 0.015 weight percent).

Suitable adhesion agents are compound(s) capable of promoting the adhesion of roofing granules to an asphalt-based substrate. Preferred adhesion agents are hydrophobic in nature, and do not significantly alter the color of the roofing granules. The adhesion agent should be compatible with the polysiloxane and the roofing granules' surfaces. Preferred adhesion agents are silicones other than those that have long-chain hydrocarbon groups. Preferred silicones are described in E. Schamberg, *Adhesion*, v. 29(11), pp. 20, 23-27 (1985), as well as in U.S. Pat. Nos. 4,486,476, 4,452,961, 4,537,595, and 4,781,950. These kinds of silicones can be purchased under the trademark TEGOSIVIN (particularly TEGOSIVIN HL100) from Goldschmidt Chemical Corporation, Hopewell, Va.

Other adhesion agents that can be suitable include resin compositions R-20, R-24, R-27, R-270, and R-272, (Union Carbide Corporation, Danbury, Conn.), Wacker Silicone Resins MK, M-62 (Wacker-Chemi GMBA, Alemania, Germany), Dri-Sil TM 73, Dow Corning 1107, Dow Corning 477 Resin (Dow Corning Corporation, Midland, Mich.), SR-82 and SM 2138 available from General Electric, Schenectady, N.Y., and oleic acid, Witco Chemical Corporation, Chicago, Ill. Mixtures or combinations of adhesion agents may be employed.

The adhesion agent is employed on the roofing granules' surfaces to an extent sufficient to promote granule adhesion to an asphalt-based substrate. The amount of adhesion agent can vary depending on the composition of the roofing granules and adhesion agent. Generally speaking, adhesion agents are employed at about 0.01 to 5 pounds per ton of roofing granules ($5 \times 10^{-4}$ to 0.25 weight percent). In the case of TEGOSIVIN silicones noted above, the adhesion agent is preferably applied to the roofing granules at about 0.5 to 1 lb. per ton of granules ($2.5 \times 10^{-3}$ to 0.05 weight percent), more preferably at 0.1 to 0.3 pound per ton (0.005 to 0.015 weight percent).

The polysiloxane and adhesion agent are preferably applied to the roofing granules as solutes in an oil solvent. The oil assists in spreading the polysiloxane and adhesion agent to the roofing granules' surfaces, and also helps reduce dust formation.

When using an oil to apply the adhesion agent and polysiloxane to roofing granules' surfaces, the oil is employed at up to about 12 pounds per ton of roofing granules (0.6 weight percent) based on the weight of roofing granules, preferably 1 to 10 pounds per ton (0.05 to 0.5 weight percent), and more preferably 5 to 8 pounds per ton (0.25 to 0.4 weight percent).

The polysiloxane having the long-chain hydrocarbon group is preferably employed in the oil at about 0.01 to 10 weight percent based on the weight of the oil. More preferably, the polysiloxane is added to the oil at about 1 to 5 weight percent. It has been found that the best results are obtained when the polysiloxane is employed at about 3 weight percent, and the polysiloxane is TEGOPREN 6800.

An adhesion agent is generally employed in the oil at about 0.5 to 12 weight percent based on the weight of the oil. When the adhesion agent is a TEGOSIVIN silicone, the adhesion agent is employed in the oil at about 1 to 5 weight percent based on the weight of the oil, more preferably 2 to 4 weight percent.

Oils selected for treating the roofing granules may be any oil that is compatible with the roofing granules' surfaces, the adhesion agent, and the polysiloxane. Typically, the oil would be one of three petroleum oils: (1) paraffinic oils; (2) naphthenic oils; and (3) aromatic oils, or a mixture thereof. These three petroleum oils are particularly suitable for use with the roofing granules because they hamper dust formation and provide good coverage of polysiloxane and adhesion agents to the granules' surfaces. Of the three petroleum oils, paraffinic and naphthenic oils are preferred over aromatic oils because the former have a more favorable flash point.

The oil(s) employed should be used in an amount that permits an adequate quantity of granules to be sufficiently coated with a thin film of the treatment composition, but not to such an extent that the quality of the shingle would be compromised. As the term is used here, "thin film" means a coating that is less than 25 micrometers thick; more preferably less than 20 micrometers thick. Typically, the thin film would be greater than at least 5 micrometers. Preferably the thin film is continuous, but it can be, and usually is, discontinuous. It is preferred that at least 50 percent of the roofing granules' surfaces be coated with the thin film.

The polysiloxane can be applied to the roofing granules' surfaces without the use of an oil. For example, the polysiloxane can be applied as an aqueous dispersion. An aqueous dispersion can be made by adding the polysiloxane to an aqueous solvent, and shaking vigorously. Preferably, the polysiloxane is added to water at about 1 to 5 weight percent based on the weight of the water. Preferably, an emulsifier is employed to disperse the polysiloxane in the aqueous solvent. Examples of emulsifiers that can be used include sodium silicate and a surfactant blend LB-9-87B available from Goldschmidt Chemical Corporation. Alternatively, a polysiloxane can be applied in an organic solvent as a homogeneous solution, preferably at about 5 to 95 weight percent (more preferably 10 to 50 weight percent) based on the weight of the solvent. Typical solvents may include toluene, methylene chloride, methylethylketone, acetone, and the like.

An adhesion agent can be applied contemporaneously with the polysiloxane to the roofing granules surfaces in the aqueous dispersion or in the homogeneous organic dispersion. Generally, the adhesion agent is employed in the aqueous solvent or in the organic solvent at 1 to 5 weight percent (more preferably 2.5 to 3 wt. %) based on the weight of the solvents.

It will be understood that other additives may be introduced into the roofing granule composition. For example, oleic acid can be used in granule treatment to promote adhesion and control dust. In addition, roofing granules can also be treated with a water-soluble inorganic copper compound to prevent algicidal growth (see e.g. U.S. Pat. No. 3,528,842).

The roofing granules can be treated with a polysiloxane having a long-chain hydrocarbon group (and other additives) in the conventional post-treatment stage; that is, after a color has been fixed to the granules. The polysiloxane and other additives such as an adhesion agent are preferably mixed with the colored roofing granules as an oil solution in a suitable mixing device such as a rotary mixer or rotary cooler. The solution of oil, adhesion agent, and polysiloxane are mixed with the granules for a time sufficient to ensure adequate contact of the oil, adhesion agent, and polysiloxane and the roofing granules. This time can vary depending on the particular application. Although the roofing granules treated with a polysiloxane are typically colored, raw roofing granules can also be used.

After the roofing granules are treated with a polysiloxane (and other ingredients), the granules are removed from the post-treatment stage. The roofing granules can then be shipped to a location where the granules are subsequently placed on an asphalt substrate.

An asphalt substrate typically includes a base mat covered with an asphalt that is filled with a mineral filler or stabilizer. An asphalt is a cementitious material having bitumens as a main constituent. A filler is typically in powder form (approximately 44 to 200 micrometers), and has been included in the range of from 0 to 70 percent by weight of the total asphalt composition.

Examples of asphalt fillers are: limestone, dolomite, nephelene syenite, or ground shale.

Asphalt-based roofing materials are formed by providing an asphalt substrate, and applying roofing granules to at least a portion of the substrate.

An asphalt substrate is typically formed by the following steps: (a) mixing a molten asphalt and a heated filler in a mixer; and (b) conveying a paper, felt, or fiberglass mat or web through a coating apparatus which coats the mat with the filled molten asphalt (typically by means of coating rolls).

Roofing granules may be applied to the substrate, for example, by dropping them onto a hot asphalt surface of the asphalt substrate.

After the granules are applied, the coated mat is cooled, for example, by spraying water onto the hot asphalt surface. Typically, a release layer is then applied to the backside of the coated mat, and a sealer is applied to a portion of the mat. To form a shingle, the mat is cut to the appropriate shape. Shingles may be applied to a roof in a few different ways. For example, the shingles may be nailed using roofing nails, or they may be stapled. Such methods of applying shingles are well known to those skilled in the art, and therefore need no further description.

This invention's objects and advantages are further illustrated in the following examples. It should be understood, however, that while the examples serve this purpose, the particular ingredients and amounts used are only exemplary; they should not be construed in a manner that would unduly limit the scope of this invention.

EXAMPLES

In the following examples, the samples that are designated with the letter "a", as in 1a, 2a . . . , are comparative samples. The samples designated with letter "b" have been prepared according to this invention.

EXAMPLE 1

In this example, roofing granules were prepared according to U.S. Pat. No. 2,927,045. The following ingredients were used in the following amounts:

|  | Grams (g) |
|---|---|
| Raw Roofing Granules (−10 + 35 mesh) | 2000 |
| Titanium Dioxide | 15 |
| Kaolin | 25 |
| Sodium Silicate solution (60% NaSiO$_4$ in H$_2$O) | 60 |
| TEGOPREN 6800 | 2 |
| Water | 20 |

The roofing granules were heated to a temperature of about 260° F. The sodium silicate solution and TEGOPREN 6800 silicone were mixed together in the water. The raw roofing granules, the mixture of TEGOPREN 6800 silicone, sodium silicate, and water, and the Kaolin pigment were added to a rotary mixer. The granules were mixed until the raw granules became colored and the surface of the granules was relatively dry. Then the roofing granules were transported to a kiln, where the granules were heated to a temperature of 950° F. (510° C.). After the granules were heated, they were cooled with water and divided into two separate samples of about 1000 g each (hereafter Samples 1a and 1b).

Sample 1a

Sample 1a was passed to a post-treatment stage, and a solution that consisted 4 g of petroleum oil and 12 g of TEGOSIVIN HL100 silicone was applied to the surfaces of the granules by mixing them in a gallon can on a paint shaker for five minutes. The post-treated granules were then tested for: (i) dust generation, (ii) resistance to staining from asphaltic oils, and (iii) water repellency. The results of these tests are tabulated in Table 1.

Sample 1b

Sample 1b of Example 1 was post-treated as described in Example 1, except 0.12 g of TEGOPREN 6800 silicone was added to the petroleum oil. This sample was also tested for staining, dust generation, and water repellency. The results are shown in Table 1.

EXAMPLE 2

Roofing granules were colored as described in Example 1, except TEGOPREN 6800 silicone was not employed in the colorization stage. The 2000 g batch of colored granules was divided into two separate samples of about 1000 g each (hereafter Samples 2a and 2b).

Sample 2a

Sample 2a was post-treated as described in Example 1, Sample 1a; that is, no TEGOPREN 6800 silicone was employed in the post-treatment. The post-treated granules were tested for dust generation, staining, and water repellency. The results of the tests are shown in Table 1.

Sample 2b

Sample 2b of Example 2 was post-treated and tested as described in Example 1, Sample 1b. The results of the tests are shown in Table 1.

TABLE 1

| Example | Test Sample | Dust Count (particles/cc) | 4-Day Stain Result | Water Repellency (minutes) |
|---|---|---|---|---|
| 1 | 1a | 489 | 5.1 | 17 |
| 1 | 1b | 6 | 0.9 | 240 |
| 2 | 2a | 450 | 5.6 | 20 |
| 2 | 2b | 8.6 | 1.0 | 240 |

Dust count represents the number of dust particles that become airborne during granule handling. Dust is generated by pouring the granules through an aerodynamic Particle Sizer 3310 from TSI, Inc., which measures the concentration of dust using laser light scattering techniques. Dust count values range from zero to 1000, with zero representing no airborne dust.

The 4-day stain result is an accelerated measurement of the tendency of granules to adsorb the asphaltic oils in an asphalt-based substrate. The granules of each sample are embedded in asphalt that has been heated to 365° F. (63° C.). The embedded granules are placed on a tray in an oven at 176° F. (80° C.) for 96 hours (4 days). The trays are removed from the oven, and the asphalt is allowed to cool to room temperature. The granules are then measured for staining under a LabScan TM colorimeter, and a staining value is calculated. Stain values range from zero to 10, with zero representing no stain and 10 representing a dark brown or completely-oiled granule.

Water repellency is a measure of a roofing granule's hydrophobicity. It is important to have hydrophobic roofing granules because hydrophilic granules have difficulty in being adhered to an asphalt-based substrate. When roofing granules are applied to an asphalt-based substrate, water is sprayed on the asphalt to cool the heated substrate. If the roofing granules are hydrophilic, water can be present between the granules and the substrate, thereby hindering granule adherence to the asphalt-based substrate.

Water repellency is measured by placing three drops of distilled water from an eye dropper into a 25 g pile of roofing granules. The drops are placed in a depression that has been made in the center of the pile of granules. The three drops of distilled water form a bead in the depression. A measurement is taken for the time it takes for the bead to break up and sink down through the granules. Longer times indicate better hydrophobicity.

The data shown in Table 1 demonstrates that roofing granules post-treated with a polysiloxane having a long-chain hydrocarbon group (Examples 2 and 4), perform superior to: (1) roofing granules treated with the same polysiloxane in the colorization stage (Example 1); and (2) roofing granules not treated with a polysiloxane having a long-chain hydrocarbon group (Example 3). The roofing granules of Examples 2 and 4 clearly demonstrated better dust control, better resistance to staining, and better water repellency.

EXAMPLES 3-12

Ten batches of roofing granules (2000 g each) were colored as described in Example 2. Each 2000 g batch of colored granules was divided into two separate samples of 1000 g each, one sample being a comparative sample (samples designated 3a, 4a ... 12a) and the other sample being treated with a polysiloxane having a long-chain hydrocarbon group (samples designated 3b, 4b, 5b ... 12b). Thus 10 samples were treated with TEGOPREN in a post-treatment stage, and 10 samples were prepared without being post-treated with TEGOPREN. All of the post-treated granules were tested for dust generation, staining, and water repellency. The results of the tests are shown in Table 2.

TABLE 2

| Example | Test Sample of Example | Properties | | |
|---|---|---|---|---|
| | | Dust Count (particles/cc) | 4-Day Stain Result | Water Repellency (minutes) |
| 3 | 3a | 458 | 5.6 | 24 |
| | 3b | 24.9 | 1.0 | 120+ |
| 4 | 4a | 635 | 3.5 | 31 |
| | 4b | 11.3 | 0.0 | 120+ |
| 5 | 5a | 651 | 6.3 | 19 |
| | 5b | 39.4 | 1.0 | 120+ |
| 6 | 6a | 448 | 5.0 | 24 |
| | 6b | 36.0 | 1.5 | 120+ |
| 7 | 7a | 270 | 4.3 | 35 |
| | 7b | 12.4 | 0.0 | 120+ |
| 8 | 8a | 876 | 5.1 | 41 |
| | 8b | 11.4 | 1.0 | 120+ |
| 9 | 9a | 250 | 6.1 | 24 |
| | 9b | 15.0 | 1.0 | 120+ |
| 10 | 10a | 377 | 3.6 | 30 |
| | 10b | 26.9 | 0.0 | 120+ |
| 11 | 11a | 752 | 4.3 | 24 |
| | 11b | 34.8 | 0.0 | 120+ |
| 12 | 12a | 506 | 4.5 | 37 |
| | 12b | 15.1 | 0.5 | 120+ |

The data shown in Table 2 demonstrates that roofing granules post-treated with a polysiloxane having a long-chain hydrocarbon ("b" samples) group perform superior to roofing granules that are not so post-treated ("a" samples).

Various modifications and alterations of this invention will become apparent to those skilled in the art without departing from the scope and spirit of this invention. It therefore should be understood that this invention is not to be limited to the illustrative embodiments set forth above, but is to be determined by the limitations set forth in the claims and equivalents thereof. It is to be further understood that this invention may be suitably practiced in the absence of any element that is not disclosed herein.

What is claimed is:

1. A roofing granule composition, which comprises: a plurality of colored roofing granules having surfaces treated in a post-treatment stage with an effective amount of a polysiloxane copolymer that comprises (i) siloxane units containing a hydrogen radical, a short-chain hydrocarbon group, or a combination thereof, and (ii) siloxane units containing at least one long-chain hydrocarbon group having less than 40 carbon atoms.

2. The roofing granule composition of claim 1, wherein the polysiloxane copolymer has a long-chain hydrocarbon group having 10 to 30 carbon atoms in the long-chain hydrocarbon group.

3. The roofing granule composition of claim 1, wherein the polysiloxane copolymer is present on the colored roofing granules' surfaces at 0.005 to 0.05 weight percent based on the weight of the roofing granules.

4. The roofing granule composition of claim 3, further comprising an adhesion agent, the adhesion agent being present on the colored roofing granules' surfaces at $5 \times 10^{-4}$ to 0.25 weight percent based on the weight of the roofing granules.

5. The roofing granule composition of claim 4, further comprising an oil, the polysiloxane copolymer and adhesion agent being applied to the colored roofing granules' surfaces as solutes in the oil, wherein the oil is present on the surfaces of the colored roofing granules at 0.05 to 0.5 weight percent based on the weight of the roofing granules.

6. The roofing granule composition of claim 5, wherein the polysiloxane copolymer is present at $2.5 \times 10^{-3}$ to 0.025 weight percent, the adhesion agent is present at 0.0025 to 0.05 weight percent, and the oil is present on the colored roofing granules at 0.25 to 0.4 weight percent, based on the weight of roofing granules.

7. The roofing granule composition of claim 5, wherein the long-chain hydrocarbon group is a straight chain or branched aliphatic group, a polyoxyalkylene, a substituted or unsubstituted aryl group having 6 to 14 ring atoms, an aralkyl having 6 to 14 ring atoms; a carboxyl or ester group, or a carbo- or heterocyclic group having 5 to 10 ring atoms.

8. The roofing granule composition of claim 1, wherein the polysiloxane copolymer contains units of the formula:

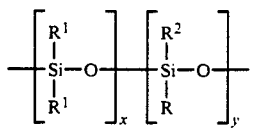

where R represents a long-chain hydrocarbon group containing less than 40 carbon atoms, each $R^1$ independently represents hydrogen or a short-chain hydrocarbon group, $R^2$ represents R or $R^1$, x is an integer of 3 to 300, and y is an integer of one to 300.

9. The roofing granule composition of claim 8, wherein the $R^1$ groups are short-chain alkyl groups or a vinyl radicals.

10. The roofing granule composition of claim 9, wherein the long-chain hydrocarbon is an alkyl or alkenyl group having 10 to 30 carbon atoms, and $R^1$ represents a short-chain alkyl group having less than 3 carbon atoms.

11. The roofing granule composition of claim 10, wherein the polysiloxane copolymer has 2 to 3 alkyl or alkenyl groups having 10 to 30 carbon atoms in the polysiloxane.

12. The roofing granule composition of claim 8, wherein the polysiloxane copolymer contains terminal groups of the formula $-Si(R^1)_3$ where $R^1$ is as defined above.

13. The roofing granule composition of claim 12, wherein at least 80 molar percent of the $R^1$ and $R^2$ groups are methyl.

14. The roofing granule composition of claim 13, wherein the polysiloxane copolymer of the formula I is terminated by groups of the formula $-Si(CH_3)_3$.

15. The roofing granule composition of claim 14, wherein the polysiloxane copolymer is applied to the roofing granules' surfaces in an oil solution that also contains an adhesion agent, the oil solution being applied to the roofing granules' surfaces at 1 to 10 pounds per ton of roofing granules, the polysiloxane copolymer being present in the oil at 0.01 to 10 weight percent and the adhesion agent being present in the oil at 0.5 to 12 weight percent.

16. A roofing granule composition, which comprises: a plurality of roofing granules having surfaces treated with a thin film of a solution that comprises a mixture of an oil, an adhesion agent, and a polysiloxane that contains units of the formula I:

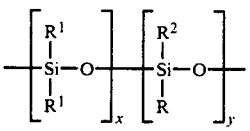

where R represents a long-chain hydrocarbon group containing less than 40 carbon atoms, each $R^1$ independently represents hydrogen or a short-chain hydrocarbon group, $R^2$ represents R or $R^1$, x is an integer of 3 to 300, and y is an integer of 1 to 300.

17. The roofing granule composition of claim 16, wherein: the oil is applied to colored roofing granules in a post-treatment stage at 0.05 to 0.5 weight percent; the polysiloxane copolymer that has at least one long-chain hydrocarbon group is applied to the roofing granules at 0.005 to 0.05 weight percent, and the adhesion agent includes a silicone other than a polysiloxane copolymer having a long-chain hydrocarbon group and is applied to the roofing granules at $5 \times 10^{-4}$ to 0.25 weight percent based on the weight of the roofing granules.

18. The roofing granule composition of claim 16, wherein at least 50 percent of the roofing granules' surfaces are treated with the solution, and the thin film is less than 20 micrometers thick.

19. A roofing material that comprises the roofing granule composition of claim 16 and an asphalt-based substrate, the roofing granules being adhered to the asphalt-based substrate.

20. A roofing material that comprises the roofing granule composition of claim 1 and an asphalt-based substrate, the roofing granules being adhered to the asphalt-based substrate.

21. A method of covering a roof, which comprises applying the roofing materials of claim 20 to the roof.

22. A method of making a roofing granule composition, which comprises:
applying an effective amount of a polysiloxane copolymer to surfaces of colored roofing granules, the polysiloxane copolymer being applied to the colored roofing granules' surfaces in a post-treatment stage and comprising (i) siloxane units containing a hydrogen radical, a short-chain hydrocarbon group, or a combination thereof, and (ii) siloxane units containing at least one long-chain hydrocarbon group having less than 40 carbon atoms.

23. The method of claim 22, wherein the polysiloxane copolymer having a long-chain hydrocarbon group is applied to the colored roofing granules is an oil solution, the oil solution also containing a silicone other than a polysiloxane having a long chain hydrocarbon group as an adhesion agent, the oil solution containing 0.01 to 10 weight-percent of the polysiloxane having a long-chain hydrocarbon group and 0.5 to 12 weight-percent of the adhesion agent, based on the weight of the oil, the oil solution being applied to the roofing granules at up to 12 pounds per ton of roofing granules.

24. The method of claim 22, wherein the polysiloxane copolymer having a long-chain hydrocarbon group is applied to the roofing granules' surfaces as an aqueous dispersion, there being 1 to 5 weight percent of the polysiloxane having a long-chain hydrocarbon group in the aqueous solvent based on the weight of the solvent.

25. The method of claim 22, wherein the polysiloxane copolymer having a long-chain hydrocarbon group is applied to the roofing granules' surfaces in an organic solvent as a homogeneous dispersion, there being 1 to 5 weight percent of the polysiloxane having a long-chain hydrocarbon group in the organic solvent based on the weight of the solvent.

26. The method of claim 23, wherein the long-chain hydrocarbon group bonded to a silicon atom on the backbone of the polysiloxane copolymer is a straight or branched aliphatic group having 10 to 30 carbon atoms or is an arakyl having 6 to 14 ring atoms.

27. The method of claim 26, wherein the alkaryl group is 2-phenylpropyl.

* * * * *

UNITED STATES PATENT AND TRADEMARK OFFICE
CERTIFICATE OF CORRECTION

PATENT NO. : 5,240,760

DATED : August 31, 1993

INVENTOR(S) : Billy L. George et al.

It is certified that error appears in the above-indentified patent and that said Letters Patent is hereby corrected as shown below:

Col. 3, line 2, after "permits" insert --them--.

Col. 3, line 37, "mesityleny" should be --mesitylenyl--.

Col. 12, line 36, after "granules", "is" should be --in--.

Col. 12, line 57, "23" should be --22--.

Signed and Sealed this

Twenty-second Day of March, 1994

Attest:

BRUCE LEHMAN

*Attesting Officer*     *Commissioner of Patents and Trademarks*